(12) United States Patent
Ralls

(10) Patent No.: US 9,079,599 B1
(45) Date of Patent: Jul. 14, 2015

(54) HAND TRUCK

(71) Applicant: Matt Ralls, Pflugerville, TX (US)

(72) Inventor: Matt Ralls, Pflugerville, TX (US)

( * ) Notice: Subject to any disclaimer, the term of this patent is extended or adjusted under 35 U.S.C. 154(b) by 11 days.

(21) Appl. No.: 14/147,118

(22) Filed: Jan. 3, 2014

Related U.S. Application Data

(60) Provisional application No. 61/749,162, filed on Jan. 4, 2013.

(51) Int. Cl.
*B62B 1/00* (2006.01)
*B62B 1/06* (2006.01)

(52) U.S. Cl.
CPC ....................................... *B62B 1/06* (2013.01)

(58) Field of Classification Search
CPC ....................................................... B62B 1/02
USPC ........ 280/47.28, 47.26, 47.18, 47.27, 33.992; 24/298, 299, 302; 312/244
See application file for complete search history.

(56) References Cited

U.S. PATENT DOCUMENTS

| 979,053 | A | * | 12/1910 | Archibald | 414/452 |
| 3,850,441 | A | * | 11/1974 | Peters et al. | 280/47.2 |
| 4,209,104 | A | * | 6/1980 | Speas | 220/646 |
| 4,726,602 | A | * | 2/1988 | Sanders et al. | 280/654 |
| 5,465,987 | A | * | 11/1995 | DellaVecchia | 280/47.28 |
| 5,678,976 | A | * | 10/1997 | Rodriguez | 414/448 |
| 6,053,515 | A | * | 4/2000 | Kelley | 280/47.18 |
| 6,105,515 | A | * | 8/2000 | Kaylor | 110/217 |
| 6,672,320 | B2 | * | 1/2004 | Rudolfs | 134/167 R |
| 8,152,180 | B2 | * | 4/2012 | Anspach | 280/47.27 |

* cited by examiner

*Primary Examiner* — John Walters
*Assistant Examiner* — James Triggs
(74) *Attorney, Agent, or Firm* — Johnson & Associates

(57) ABSTRACT

A method and apparatus is provided for improved hand trucks. In some embodiments, a hand truck has side members extending from the frame to help retain objects being moved with the hand truck. The side members extend outward from the frame of the hand truck to prevent round objects from rolling sideways off the hand truck while in transit.

20 Claims, 10 Drawing Sheets

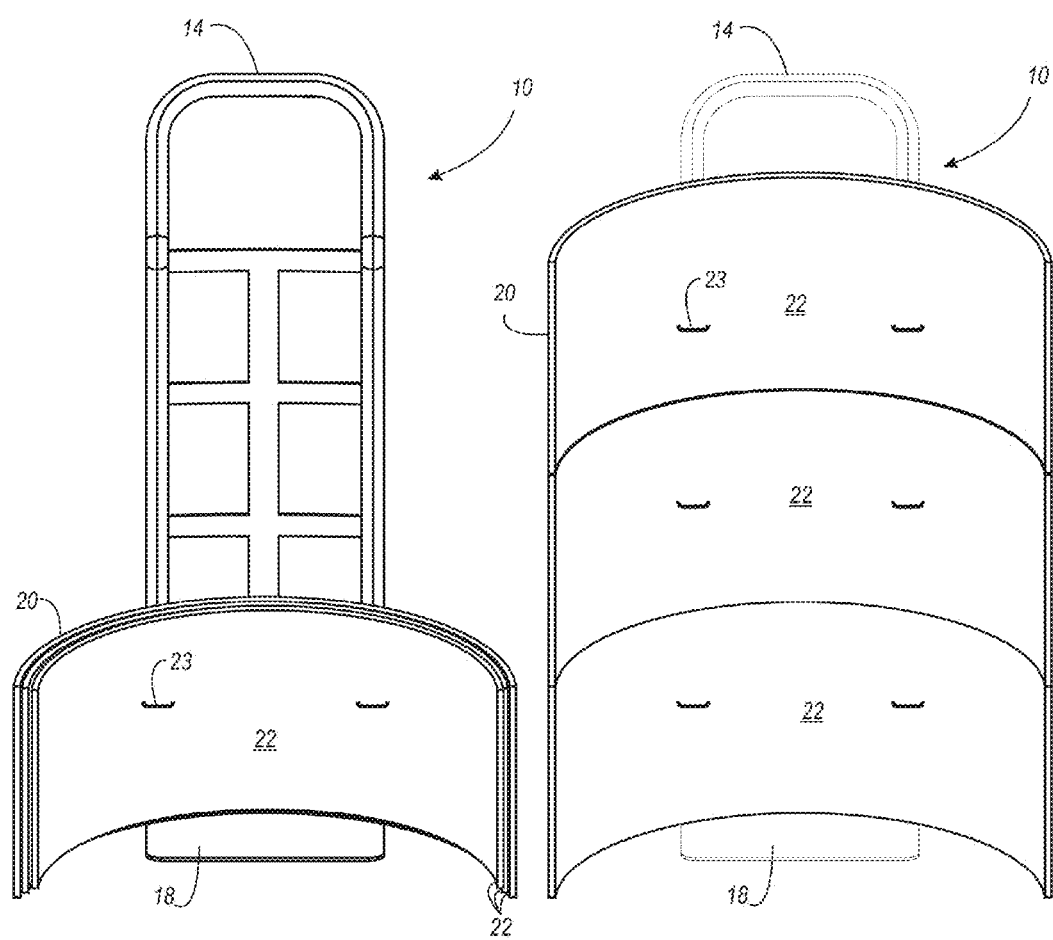

HAND TRUCK

CROSS REFERENCE TO RELATED APPLICATIONS

This application claims priority under 35 U.S.C. §119 to commonly owned U.S. provisional patent application Ser. No. 61/749,162 filed on Jan. 4, 2013, entitled "HAND TRUCK", which is incorporated by reference herein.

FIELD OF THE INVENTION

This application relates to hand trucks, also referred to as hand carts or dollies. In particular, this application relates to a hand truck with an improved structure that more securely holds articles being transported.

BACKGROUND OF THE INVENTION

Hand trucks are generally used for moving heavy articles that are not easily lifted by hand. A typical hand truck has an upright frame, a handle, and two wheels. A flat base plate is provided at the lower portion of the frame for sliding under an article to be moved. When users pull the handle of a hand truck toward themselves, the base plate pivots upward and the frame and loaded articles are supported by the wheels. The articles resting on the base plate may then be moved to a desired location.

While hand trucks aid in the movement of heavy articles, conventional hand trucks have drawbacks. For example, when moving round objects, such as buckets or barrels, the round objects tend to roll sideways off the hand truck. This results in users sometimes taking the time to secure the round objects to the hand truck with rope, straps, elastic cords, etc. While helping with the problem, securing objects in this manner is time consuming.

SUMMARY OF THE INVENTION

A hand truck has a frame, two or more wheels coupled to the frame, a horizontal base plate coupled to the frame, a first side wall coupled to the frame and extending outward and forward from the frame, a second side wall coupled to the frame and extending outward and forward from the frame, wherein the first and second side walls form a pocket for retaining objects being moved with the hand truck.

Another embodiment provides a method of retaining objects in a hand truck, the hand truck having a frame, two or more wheels coupled to the frame, and a horizontal base plate coupled to the frame, the method including coupling a first side wall to the frame, the first side wall extending outward and forward from the frame, and coupling a second side wall to the frame, the second side wall extending outward and forward from the frame.

Another embodiment provides a hand truck including a frame, two or more wheels coupled to the frame, a horizontal base plate coupled to the frame, a curved panel coupled to the frame of the hand truck, the curved panel forming a concave pocket above the horizontal base plate for retaining objects moved with the hand truck.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIGS. 6-13 are front perspective views showing several examples of different configurations of hand trucks and side members.

DETAILED DESCRIPTION OF THE PREFERRED EMBODIMENTS

Figure 1:
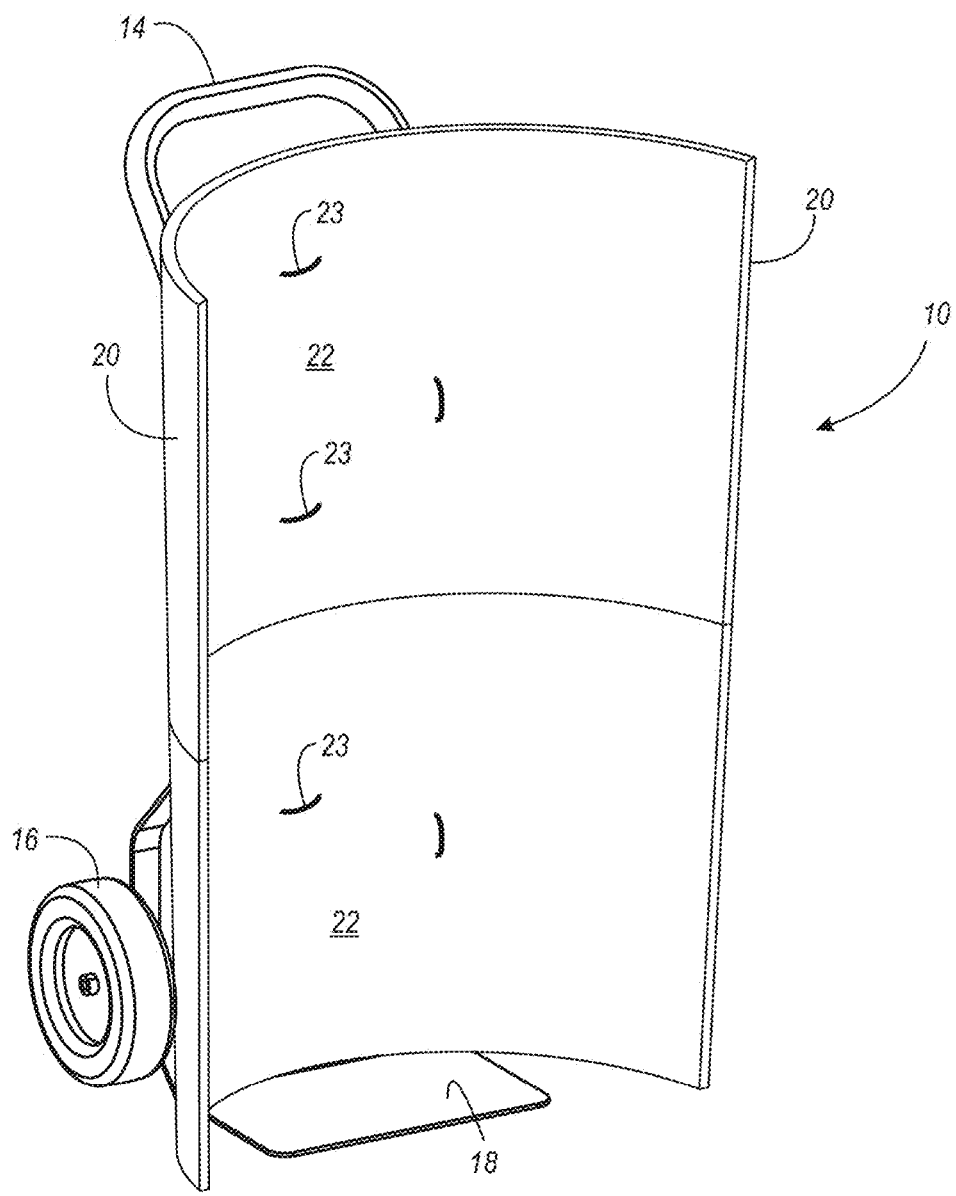
FIG. 1 is a front perspective view of a hand truck according to one embodiment.
Figure 2:
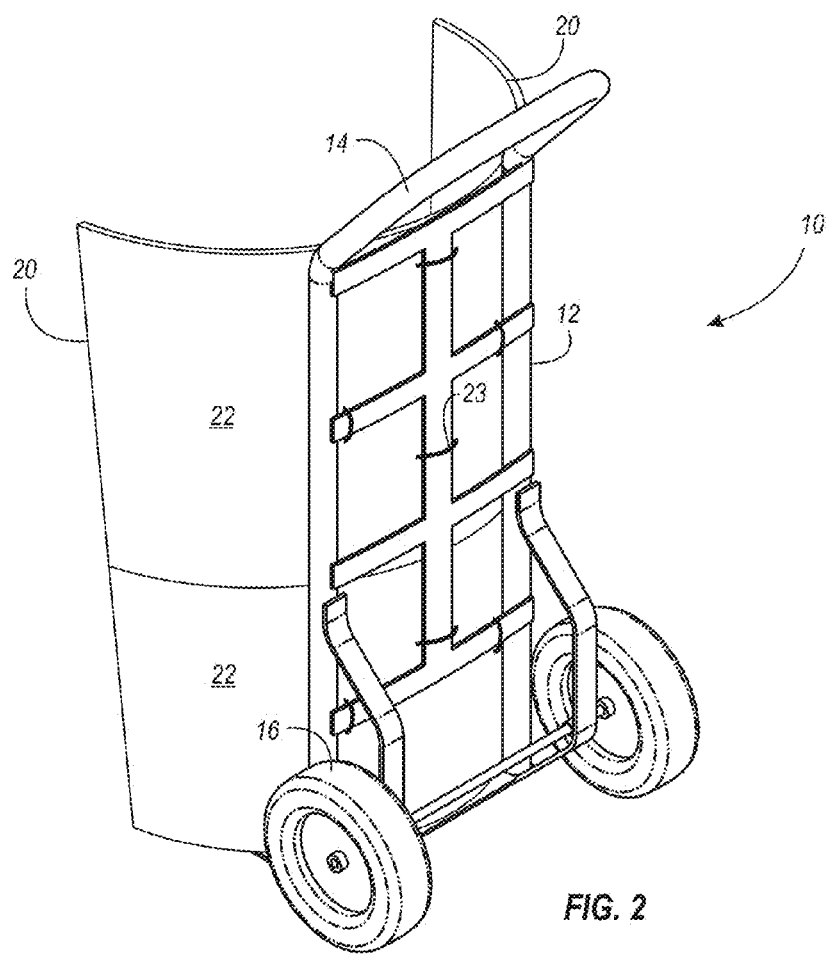
FIG. 2 is a rear perspective view of the hand truck shown in FIG. 1.
Figure 3:
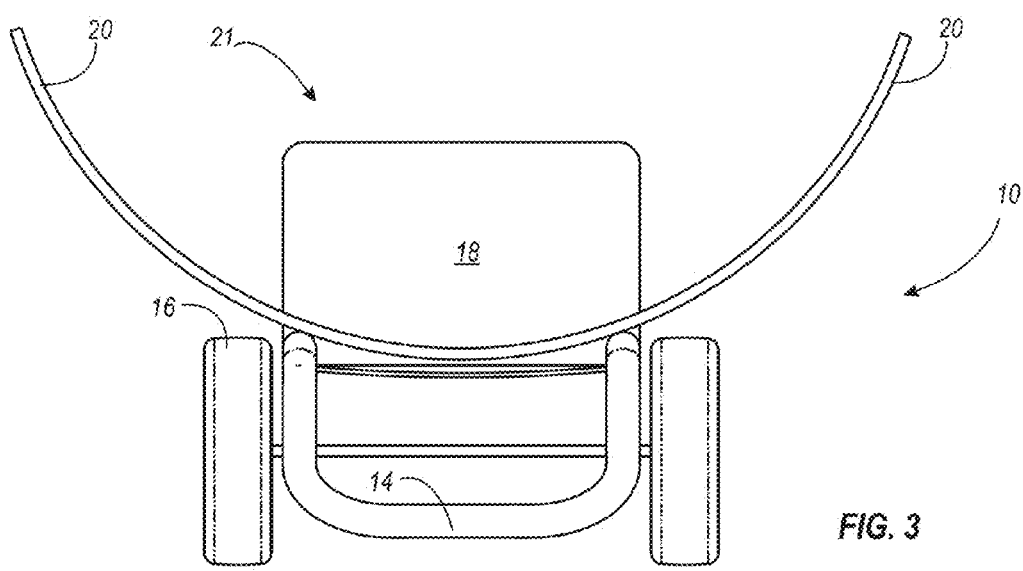
FIG. 3 is a top view of the hand truck 10 shown in FIG. 1.

FIGS. 1-3 are views of one example of a hand truck according to this disclosure. In general, a hand truck is provided with side members extending from the frame of the hand truck to help retain objects being moved with the hand truck. As mentioned above, problems can occur with conventional hand trucks when moving round objects, such as buckets or barrels, as they tend to roll to one side or the other while being moved. In the example described below, curved side members extend outward from the frame of the hand truck to prevent round objects from rolling sideways off the hand truck while in transit. Of course, other configurations of side members may also be used. Also, use of the hand truck is not limited to round objects. The extended side members also help prevent non-round objects from sliding off of the hand truck, such as a tall stack of rectangular boxes.

FIG. 1 is a front perspective view of a hand truck 10. FIG. 2 is a rear perspective view of the hand truck 10. FIG. 3 is a top view of the hand truck 10. The hand truck 10 has an upright frame 12, and handle 14, and two wheels 16. A base plate 18 is coupled to the bottom of the frame 12 and is generally horizontal when the frame 12 is in the upright position. When a user pulls the handle 14 of the hand truck 10 toward the user's body, the frame 12 will pivot about the wheel axle, lifting the base plate 18, and any loaded articles, up off the floor, allowing the articles to be more easily moved.

As shown in FIGS. 1-3, the hand truck 10 has side members 20 extending outward to help retain articles being moved. In the example of FIGS. 1-3, side members 20 are formed by a pair of curved panels 22 coupled to the frame 12. Of course, other configurations of side members are also possible, including straight panels, curved panels, etc. Also, the side members 20 may be comprised of a single panel or multiple panels. In the example shown (e.g., FIG. 1), the curved panels 22 are each formed by a semi-circular panel extending less than 180 degrees, and having a radius of curvature selected based on the size and shape of articles to be moved, the frame dimension, etc. In the example shown in FIGS. 1-2, the panels 22 are secured to the frame 12 by a plurality of fasteners 23 threaded through holes in the panels 22 and around the frame 12. The fasteners 23 can be comprised of any desired type of fastener, including zip ties, wire, string, glue or welds, bolts or screws, brackets, etc. In another example, the panels 22 are designed with enough strength to also serve as the frame 12.

As shown best in FIG. 3, when the hand truck 10 is tilted back, the curved panels 22 form a concave pocket 21 above the base plate 18 that will tend to keep articles being moved centered about the frame 12. Without the side members 20, if a user moved articles with the hand truck 10, the articles may tend to roll or slide sideways as the user moves the hand truck 10, especially when traversing uneven ground.

Figure 4:
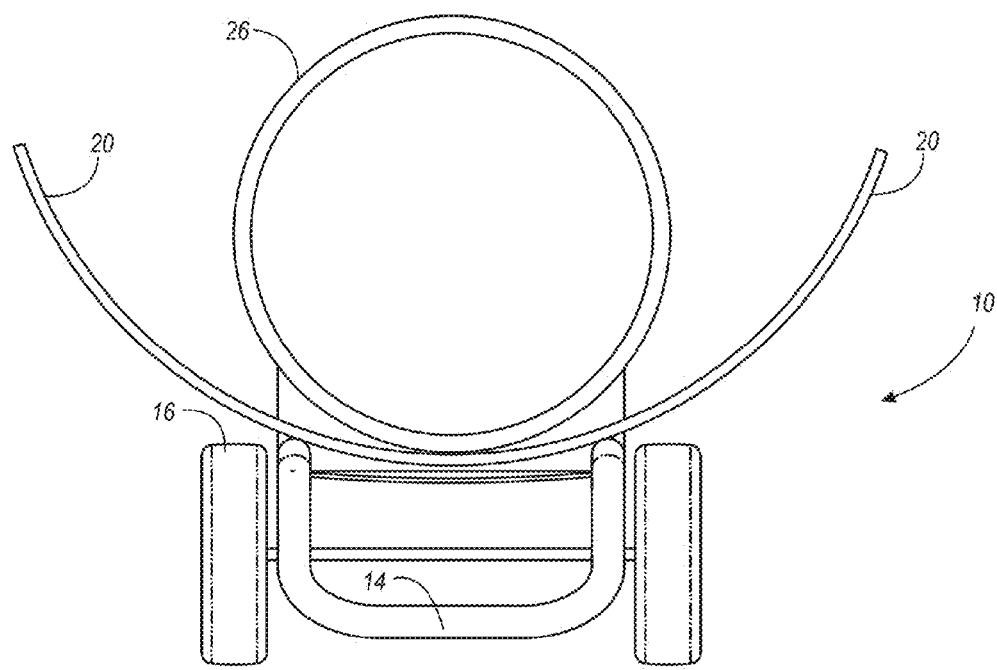
FIGS. 4 and 5 are top views illustrating articles loaded on the hand truck shown in FIG. 1.
Figure 5:
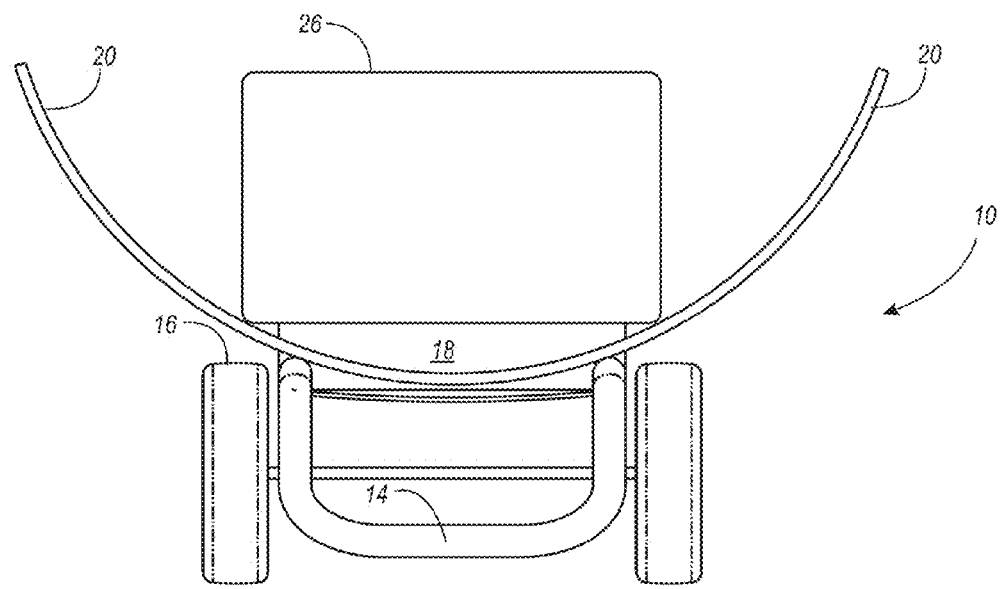

FIGS. 4 and 5 are top views illustrating articles loaded on the hand truck 10 and being retained by the side members 20. FIG. 4 shows a round object 24 (or a stack of round objects 24) placed on the base plate 18, between the side members 20. FIG. 5 shows a rectangular object 26 (or a stack of rectangular objects 26) placed on the base plate 18, between the side members 20. In both examples, the side members 20 will help keep the objects 24 and 26 in place while the objects are being moved.

The hand truck 10 described above can be configured in any desired manner. In one example, the hand truck 10 with side members 20 can be manufactured together as one product. In another example, a kit can be provided with side members that attach to a conventional hand truck. In the example shown in FIGS. 1-3, the curved panel 22 (which forms the side members 20) is shown secured to the frame of a hand truck. The side members 20 can be permanently or temporarily attached to the frame 12. In another example, instead of a continuous curved panel (like panel 22 shown in FIGS. 1-3), separate side members 20 extend outward from the frame 12. The side members 20 can be formed of a panel(s), as shown, or can be formed by individual bars or other structures extending from the frame 12.

In other examples, the side members 20 can be configurable to suit different needs. For example, it may be desired to use a hand truck in a conventional manner, without the side members 20. In one example, the side members 20 are removable. In other examples, the side members 20 are retractable. In either case, a user has the option of using the side members, or not. Other configurations are also possible, including folding side members, flexible side members, etc.

FIGS. 6-13 show several examples of different configurations of hand trucks and side members. FIGS. 6-7 show an example of a hand truck 10 with vertically collapsible/telescoping side members. FIGS. 6-7 show a hand truck 10 having a frame 12 and base plate 18. In this example, the side members 20 are formed by three semi-circular panels 22. The user has the option of raising all three panels 22 (FIG. 7), or sliding the panels 22 down (FIG. 6), depending on what is needed at the time. The panels 22 can be movably secured to the frame 12 in any desired manner, as one skilled in the art would understand.

Figure 8:
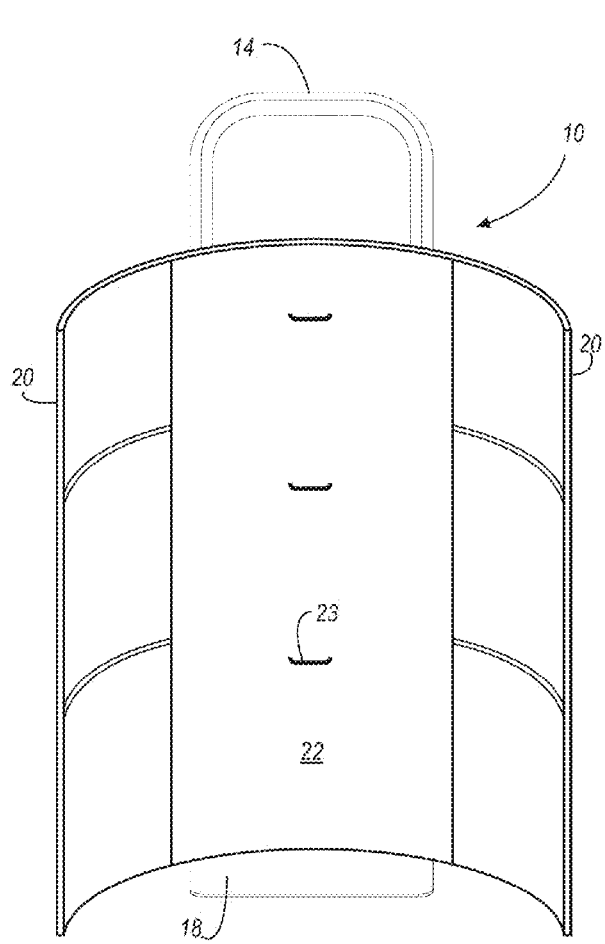
Figure 9:
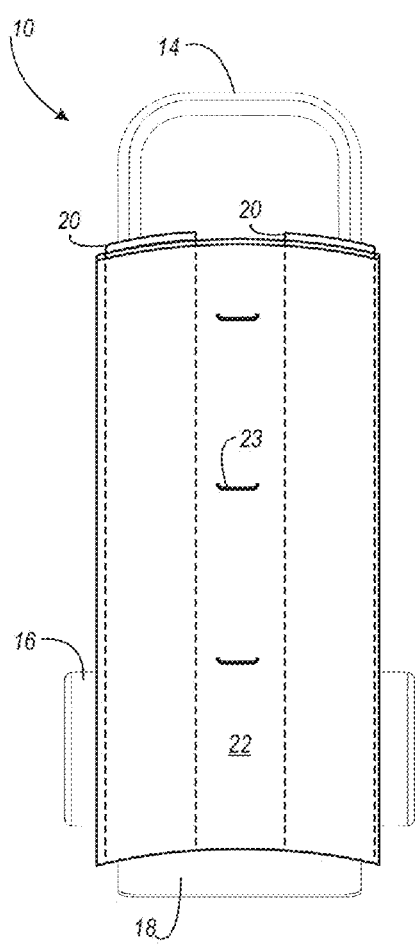
Figure 10:
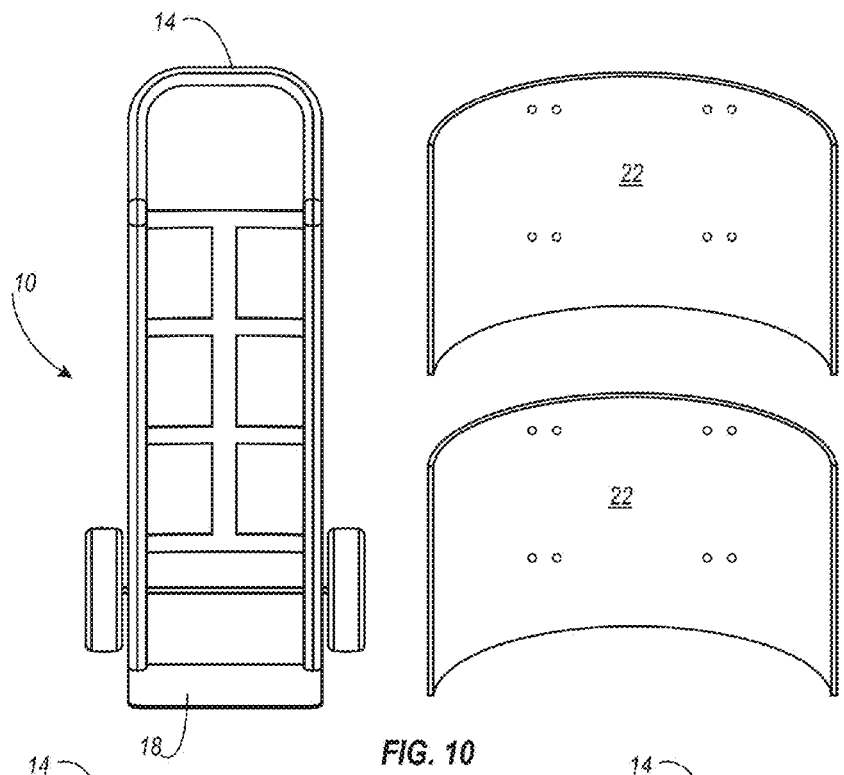
Figures 11, 12:
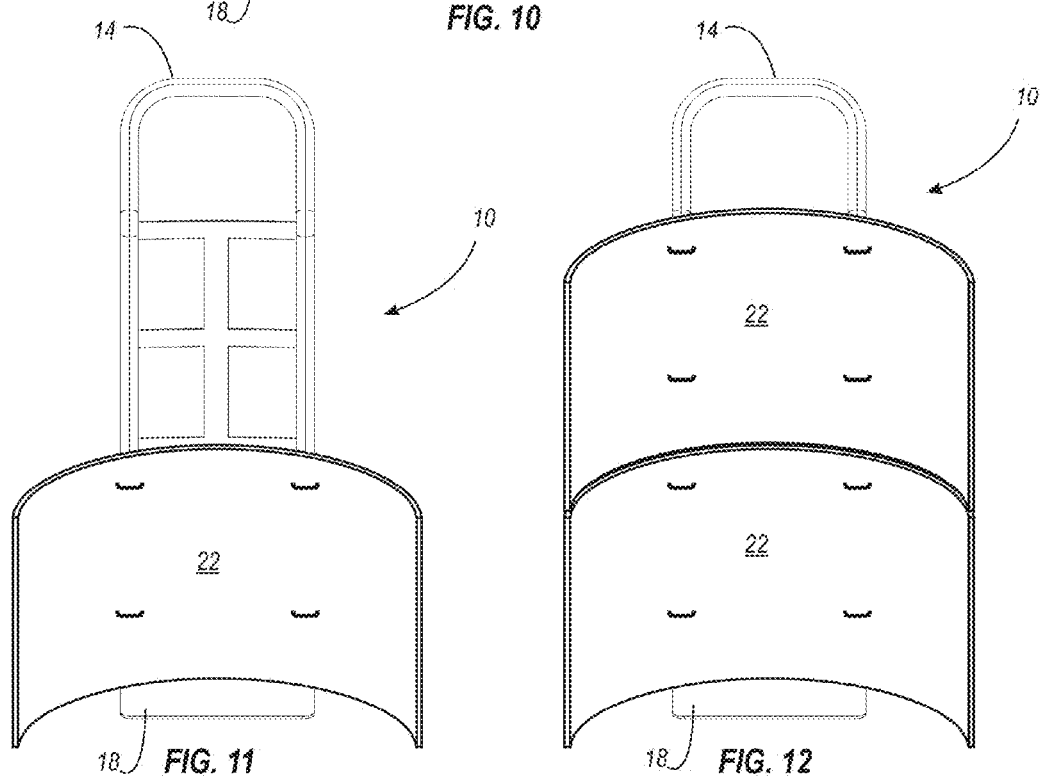

FIGS. 8-9 show a configuration similar to that in FIGS. 8-9, except that the side members 22 horizontally collapse/telescope inward, rather than downward. In this example, the side members 20 are configured to slide rearward, behind the center portion of the side members 22, or behind the frame 12. When a user needs the side members 20, they are extended out (FIG. 8). When the side members 20 are not needed, they can be retracted (FIG. 9). In the example shown, the side members 20 have grooves 30 formed that match protrusions (not shown) on the rear surface of the center portion of the side members 22.

Figure 13:
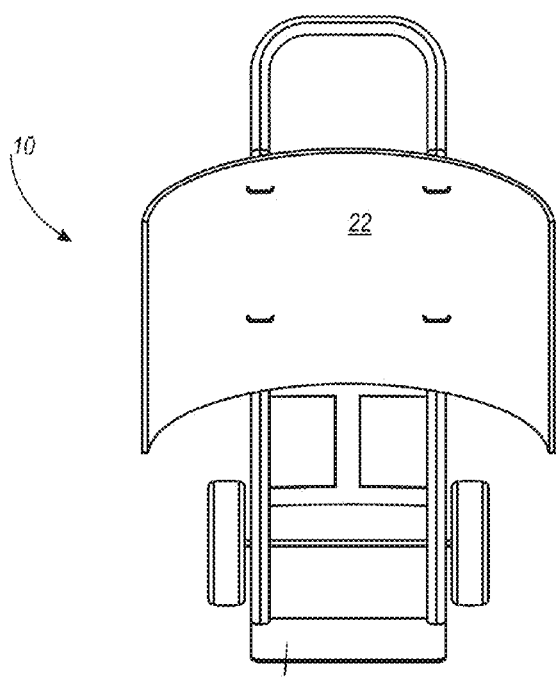

FIGS. 10-13 show a configuration where the hand truck 10 has two removable panels 22. In this example, the user can use the hand truck 10 with both side members 20 attached (FIG. 12), no panels 22 attached (FIG. 10), the bottom panel 22 attached (FIG. 11), or the top panel 22 attached (FIG. 13).

Figure 14:
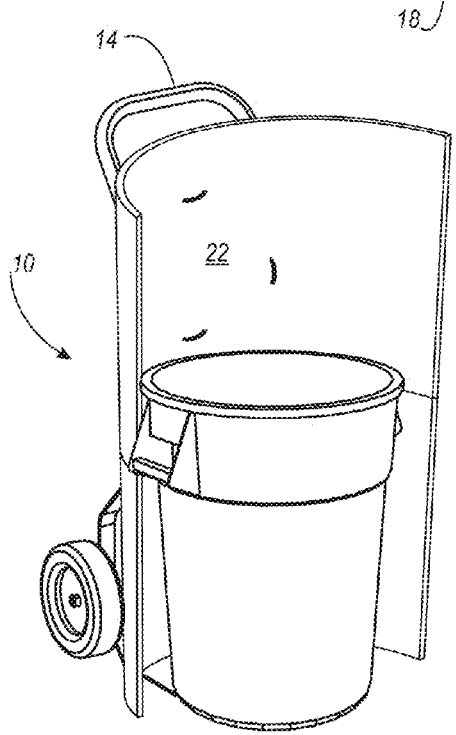
FIGS. 14-16 are views illustrating various examples of different articles loaded on a hand truck.
Figure 15:
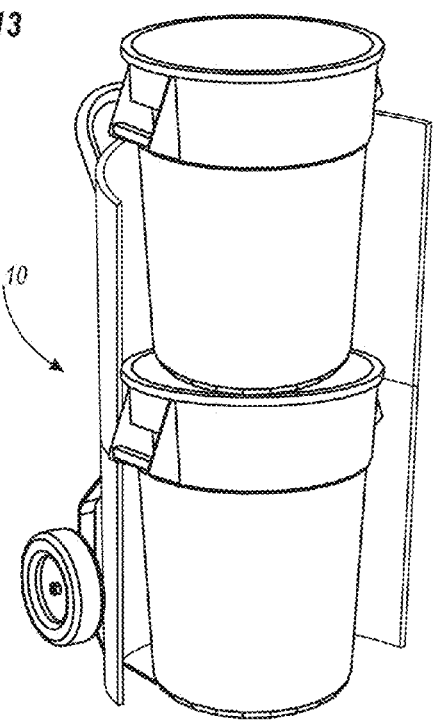
Figure 16:
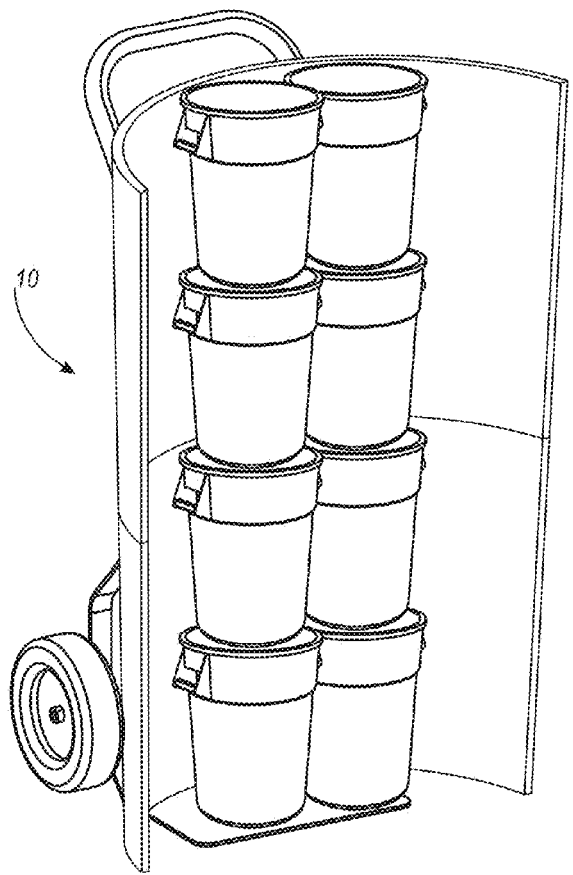

FIGS. 14-16 are views illustrating various examples of different articles loaded on the hand truck 10. FIG. 14 show an example of the hand truck 10 loaded with a large round article (in this example, a trash barrel, or similar item). FIG. 15 shows an example of the hand truck 10 loaded with two stacked large round articles. FIG. 16 shows an example of the hand truck 10 loaded with eight smaller round articles (in this example, eight buckets). As shown in each of the views (FIGS. 14-16), the side members of the hand truck help to hold the articles in place, by preventing the articles from rolling or sliding to either side.

Figure 17:
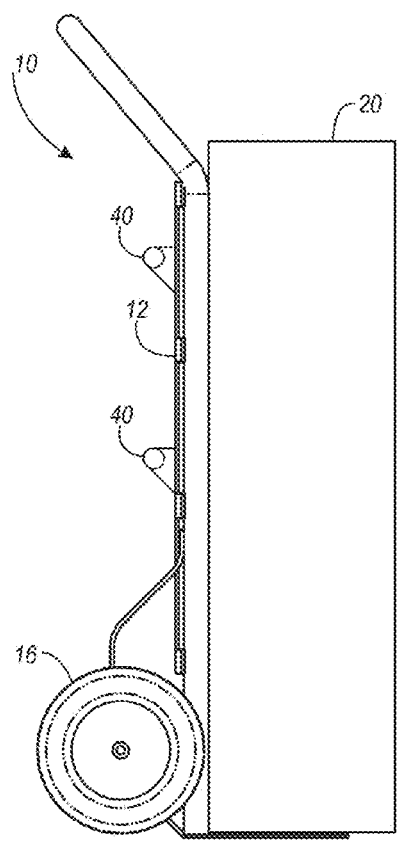
FIG. 17 is a side view showing a hand truck having rear-facing handles.

FIG. 17 is a side view showing another example of a hand truck. The hand truck 10 has side walls 20 coupled to a frame 12. First and second handles 40 are coupled to the hand truck 10, and extend from the rear side of the hand truck 10. The handles 40 provide a user with another place to grab and pull the hand truck 10. In one example, the handles 40 are formed integral with the side walls 20. In another example, the handles 40 are coupled directly to the frame 12.

Figure 18:
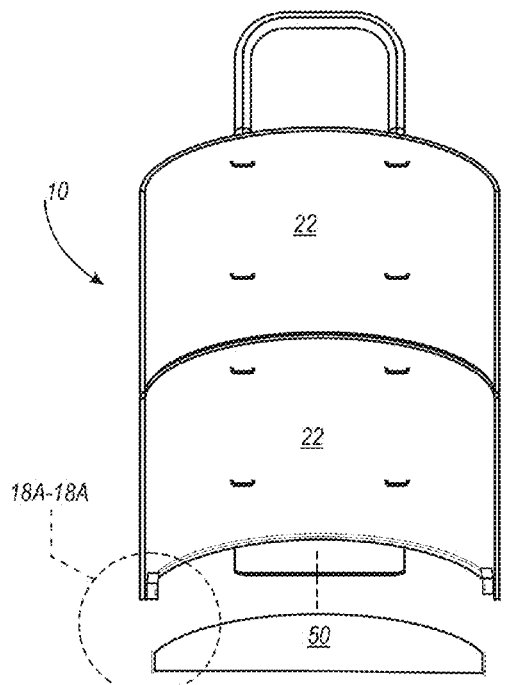
FIGS. 18-24 show examples of hand trucks with a configurable bottom plates.
Figure 18A:
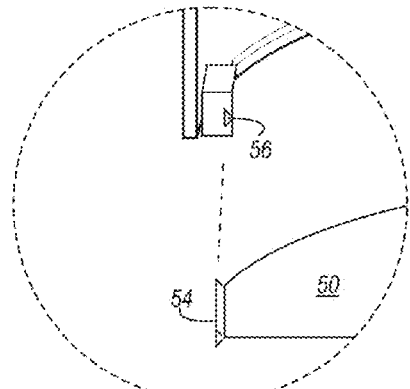
Figure 19:
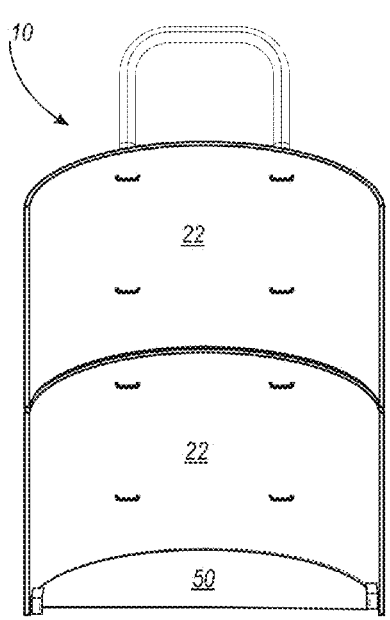
Figure 20:
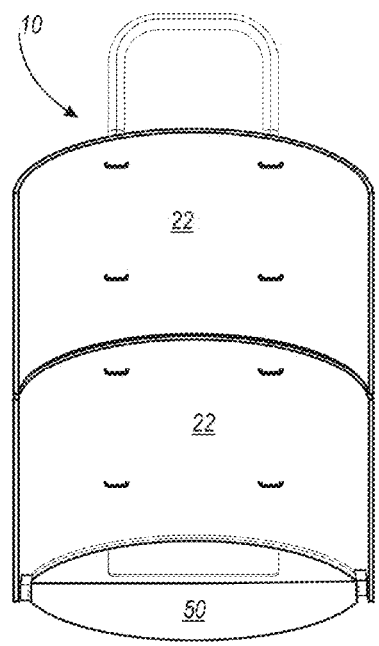

FIGS. 18-20 show another example of a hand truck, with a configurable bottom plate. The hand truck 10 shown in FIG. 18 is similar to the example shown in FIG. 1. The hand truck 10 has side panels 20, and a removable and configurable bottom plate 50. FIG. 18 is a perspective exploded view of the hand truck 10 and bottom plate 50. FIG. 18A is an enlarged partial view taken along line 18A-18A in FIG. 18. At opposite ends of the base plate 50, a dovetail joint couples the base plate 50 the hand truck. In the example shown, a groove 52 is formed in the panel 22 for receiving the bottom plate 50 (FIG. 19). As seen best in FIG. 18A, a male dovetail joint 54 is formed at each end of the plate 50. A matching female dovetail joint 56 is formed on the panel 22. When the bottom plate 50 is placed in the position shown in FIG. 19, the plate 50 is disposed within the groove 52, with the dovetail joints holding the ends securely. With the plate 50 in the position shown in FIG. 19, the plate 50 creates a bottom surface that is larger than the base plate 18, which is useful for certain applications, such as for hauling small objects. The bottom plate 50 can be flipped 180 degrees and secured by the dove tail joints, as shown in FIG. 20. With the plate 50 in the position shown in FIG. 20, the plate 50, in combination with the base plate 18, creates a large bottom surface.

Figure 21:
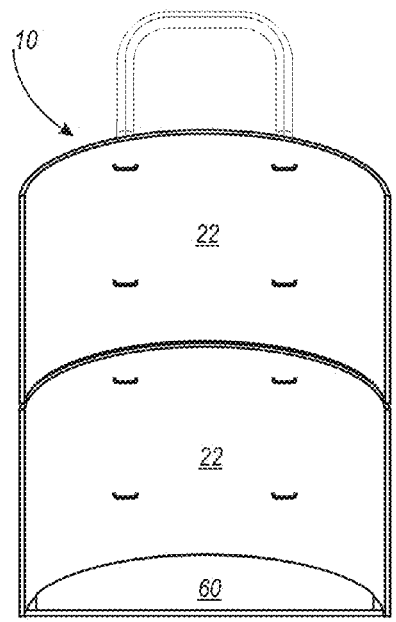
Figure 22:
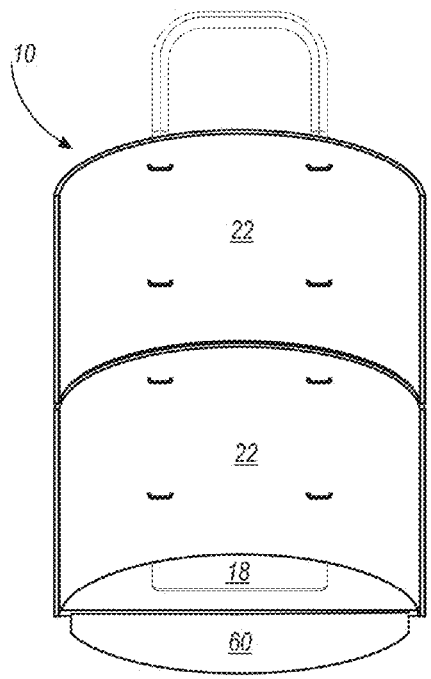

FIGS. 21-22 show another example of a hand truck, with a configurable bottom plate. The hand truck 10 shown in FIGS. 21-22 is similar to the example shown in FIG. 1. The hand truck 10 has side panels 20, and a movable bottom plate 60. The bottom plate 60 is hinged, allowing the bottom plate 60 to move between an inward position (FIG. 21) and an outward position (FIG. 22). The bottom plate 60 provides similar advantages as the bottom plate 50, described above.

Figure 23:
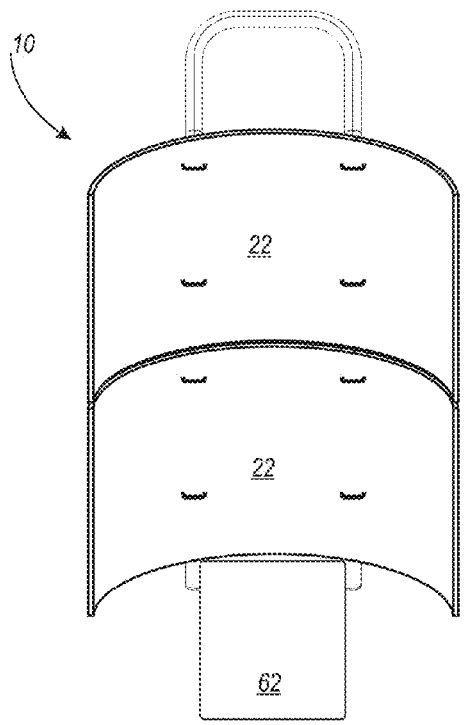
Figure 24:
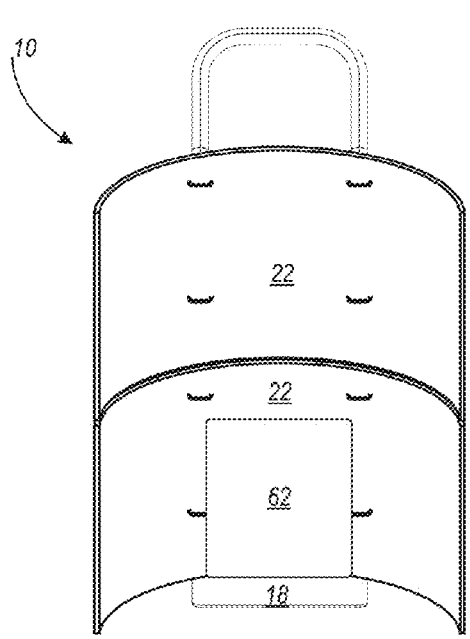

FIGS. 23-24 show another example of a hand truck, with a configurable bottom plate. The hand truck 10 shown in FIGS. 23-24 is similar to the example shown in FIG. 1. The hand truck 10 has side panels 20, and a movable bottom plate 62. The bottom plate 60 is hinged, allowing the bottom plate 60 to move between an upward position (FIG. 24) and a downward position (FIG. 23). The bottom plate 60 provides similar advantages as the bottom plates 50 and 60, described above.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A hand truck comprising:
   a frame having a bottom portion and a top portion;
   two or more wheels coupled to the frame;
   a horizontal base plate coupled to the frame proximate the bottom portion of the frame;
   a rigid curved wall coupled to the frame and extending outward and forward from the frame, the rigid curved wall being comprised of a semi-circular panel extending upward from the bottom portion of the frame to the top portion of the frame, wherein the rigid curved wall forms a pocket for retaining objects being moved with the hand truck wherein the rigid curved wall has a radius of curvature large enough that the rigid curved wall extends outward substantially beyond the two or more wheels; and a plurality of pairs of apertures formed in the rigid curved wall, each of the pairs of apertures formed at a tangent of the rigid curved wall at locations enabling one or more fasteners to pass through the apertures and around the frame to secure the rigid curved wall to the frame.

2. The hand truck of claim 1, wherein the rigid curved wall is formed by first and second semi-circular panels coupled to the frame.

3. The hand truck of claim 1, wherein the rigid curved wall is vertically expandable.

4. The hand truck of claim 1, wherein the rigid curved wall is horizontally expandable.

5. The hand truck of claim 1, further comprising first and second handles coupled to the frame and extending from the back of the hand truck.

6. The hand truck of claim 1, further comprising a movable bottom plate movably coupled to the rigid curved wall.

7. The hand truck of claim 6, wherein the movable bottom plate is coupled to the rigid curved wall by dovetail joints.

8. The hand truck of claim 6, wherein the movable bottom plate is coupled to the rigid curved wall by a hinge.

9. A method of retaining objects in a hand truck, the hand truck having a frame with a bottom portion and a top portion, two or more wheels coupled to the frame, and a horizontal base plate coupled to the frame proximate the bottom portion of the frame, the method comprising:

coupling a rigid curved wall to the frame, the rigid curved wall extending outward and forward from the frame, wherein the rigid curved wall extends outward substantially past the two or more wheels, and wherein the rigid curved wall extends upward from the bottom portion of the frame to the top portion of the frame; and forming a plurality of pairs of apertures in the rigid curved wall, each of the pairs of apertures formed at a tangent of the rigid curved wall at locations enabling one or more fasteners to pass through the apertures and around the frame to secure the rigid curved wall to the frame.

10. The method of claim 9, further comprising movably coupling a bottom plate to the hand truck to increase the surface area upon which the objects can be supported.

11. The method of claim 10, wherein the bottom plate is coupled to the hand truck by a hinge.

12. The method of claim 10, wherein the bottom plate is slidably received by the hand truck.

13. The method of claim 12, further comprising forming dovetail joints to secure the bottom plate to the hand truck.

14. The method of claim 10, wherein the rigid curved wall is vertically expandable.

15. The method of claim 10, wherein the rigid curved wall is horizontally expandable.

16. A hand truck comprising:
a frame having a bottom portion and a top portion;
two or more wheels coupled to the frame;
a horizontal base plate coupled to the frame proximate the bottom portion of the frame;
a curved panel coupled to the frame of the hand truck, the curved panel forming a concave pocket above the horizontal base plate for retaining objects moved with the hand truck, the curved panel extending from the bottom portion of the frame to the top portion of the frame, the curved panel having a radius of curvature and outside edges, wherein the radius of curvature large enough that the outside edges of the curved panel extend outward substantially beyond the two or more wheels when coupled to the frame; and
a plurality of pairs of apertures formed in the curved panel, each of the pairs of apertures formed at a tangent of the curved panel at locations enabling one or more fasteners to pass through the apertures and around the frame to secure the curved panel to the frame.

17. The hand truck of claim 16, wherein the curved panel is formed by first and second sub-panels.

18. The hand truck of claim 16, further comprising a movable bottom plate coupled to the curved panel.

19. The hand truck of claim 1, further comprising a plurality of zip ties, each zip tie passing through one of the pairs of apertures and around the frame to secure the rigid curved wall to the frame.

20. The method of claim 9, further comprising inserting a plurality of zip ties through adjacent apertures and around the frame to secure the rigid curved wall to the frame.

* * * * *